United States Patent
Teeten

(10) Patent No.: US 6,761,365 B2
(45) Date of Patent: Jul. 13, 2004

(54) BASKET FOR A SELF-SERVICE STORE SHOPPING CART

(76) Inventor: Philippe Teeten, 385, route de Teteghem, F-59380 Coudekerque Village (FR)

( * ) Notice: Subject to any disclaimer, the term of this patent is extended or adjusted under 35 U.S.C. 154(b) by 0 days.

(21) Appl. No.: 10/204,047

(22) PCT Filed: Jan. 16, 2001

(86) PCT No.: PCT/FR01/00134
§ 371 (c)(1), (2), (4) Date: Aug. 16, 2002

(87) PCT Pub. No.: WO01/62574
PCT Pub. Date: Aug. 30, 2001

(65) Prior Publication Data
US 2003/0011152 A1 Jan. 16, 2003

(30) Foreign Application Priority Data
Feb. 23, 2000 (FR) ............................................. 00 02239
Mar. 28, 2000 (FR) ............................................. 00 03879

(51) Int. Cl.⁷ ............................................. B62D 39/00
(52) U.S. Cl. ............. 280/33.992; 280/651; 280/DIG. 4
(58) Field of Search ....................... 280/33.991, 33.992, 280/33.997, 651, 659, DIG. 4; 220/8, 489; D34/17, 19

(56) References Cited

U.S. PATENT DOCUMENTS

| | | | | |
|---|---|---|---|---|
| 2,456,817 A | * | 12/1948 | Davenport | 280/641 |
| 2,812,187 A | * | 11/1957 | Nicholl et al. | 280/33.995 |
| 2,958,536 A | * | 11/1960 | Young | 280/33.995 |
| 3,706,460 A | | 12/1972 | Thomas | |
| 3,909,034 A | * | 9/1975 | Trubiano | 280/47.34 |
| 4,441,734 A | * | 4/1984 | Schlissel | 280/638 |
| 6,036,219 A | * | 3/2000 | Oefelein et al. | 280/638 |
| 6,406,041 B1 | * | 6/2002 | Rea | 280/33.992 |

FOREIGN PATENT DOCUMENTS

FR    2672560    *    2/1991

* cited by examiner

*Primary Examiner*—Bryan Fischmann
(74) *Attorney, Agent, or Firm*—Edward J. Kondracki; Miles & Stockbridge P.C.

(57) ABSTRACT

A shopping basket for self service store shopping comprises two main parts, a fixed rear part and a movable front part which automatically adjust for length and width when nesting with another shopping basket. Use of tubular elements cooperating along transverse axes allows translational adjustment of the lower and side walls of the basket along a longitudinal axis of the cart and axis transverse thereto.

10 Claims, 3 Drawing Sheets

BASKET FOR A SELF-SERVICE STORE SHOPPING CART

FIELD OF THE INVENTION

The invention relates to a basket for a self-service store shopping cart.

BACKGROUND OF THE INVENTION

Conventionally, a cart used in self-service stores comprises a chassis, equipped with wheels, which supports a basket.

This basket is formed from wires that are shaped, and in particular, welded to one another so as to delimit a bottom, a front wall, a rear wall and the two left and right side walls of the basket.

In order to allow the carts to nest inside one another, particularly in order to store them behind one other, the basket has a cross-section that, from the front wall to the rear wall, steadily increases.

Thus, from the front wall, the two side walls diverge and increase in height, and the bottom descends toward the rear.

Thus, seen from above, the basket has the shape of an isosceles trapezoid, the large base of which is formed by the rear wall.

Seen from the side, the basket also has a trapezoidal shape.

Such a shape is comparable to a truncated pyramid.

The top part of the rear wall is articulated so that the front end of a second cart coming into contact with the rear wall of this cart progressively swings this rear wall toward the front, thus allowing the nesting of the carts.

Arrangements for the nesting of the chassis are also used.

Nowadays, many self-service stores offer three sizes of carts; thus, the user chooses the cart he thinks is best adapted to his current needs.

The carts must be arranged by size, which is a limitation for the users.

Since it is not unusual for the choice of a small cart to prove inappropriate, carts having a variable basket volume have been made.

To modify a cart's capacity, it is known to equip its front face with an additional basket.

The latter is, for example, pivot-mounted around an axis of rotation.

Such a solution is not very practical to use.

SUMMARY OF THE INVENTION

The subject of the invention is a basket for a self-service store shopping cart, which basket, of variable volume, comprises a bottom, a front wall, a rear wall, and two left and right side walls, with a vertical cross-section that, from the front wall to the rear wall, increases along the two main axes, this basket comprising two parts, a fixed rear part and a movable front part, this basket being characterized in that the front part comprises:

- a lower wall formed essentially of slender elements which, extending along the longitudinal axis of the basket, which cooperate via means for translational guidance along the longitudinal axis A of the basket with the bottom of the rear part of the basket, continuing this lower wall so as to extend in the plane of the front wall, a support bearing the means for translational guidance along a horizontal axis C parallel to the front wall,
- slender elements forming two lateral sides, each parallel to a side wall of the rear part, which have their so-called proximal ends guided in translation with the side wall in question, and their other, so-called distal ends bent in the plane of the front wall so as to cooperate with the translational guide means borne by the support, thereby forming the front wall.

BRIEF DESCRIPTION OF THE DRAWING

The invention will be clearly understood with the help of the description below, given as a nonlimiting example, in connection with the following drawings, wherein.

DESCRIPTION OF THE PREFERRED EMDODIMENT(S)

Figure 1:
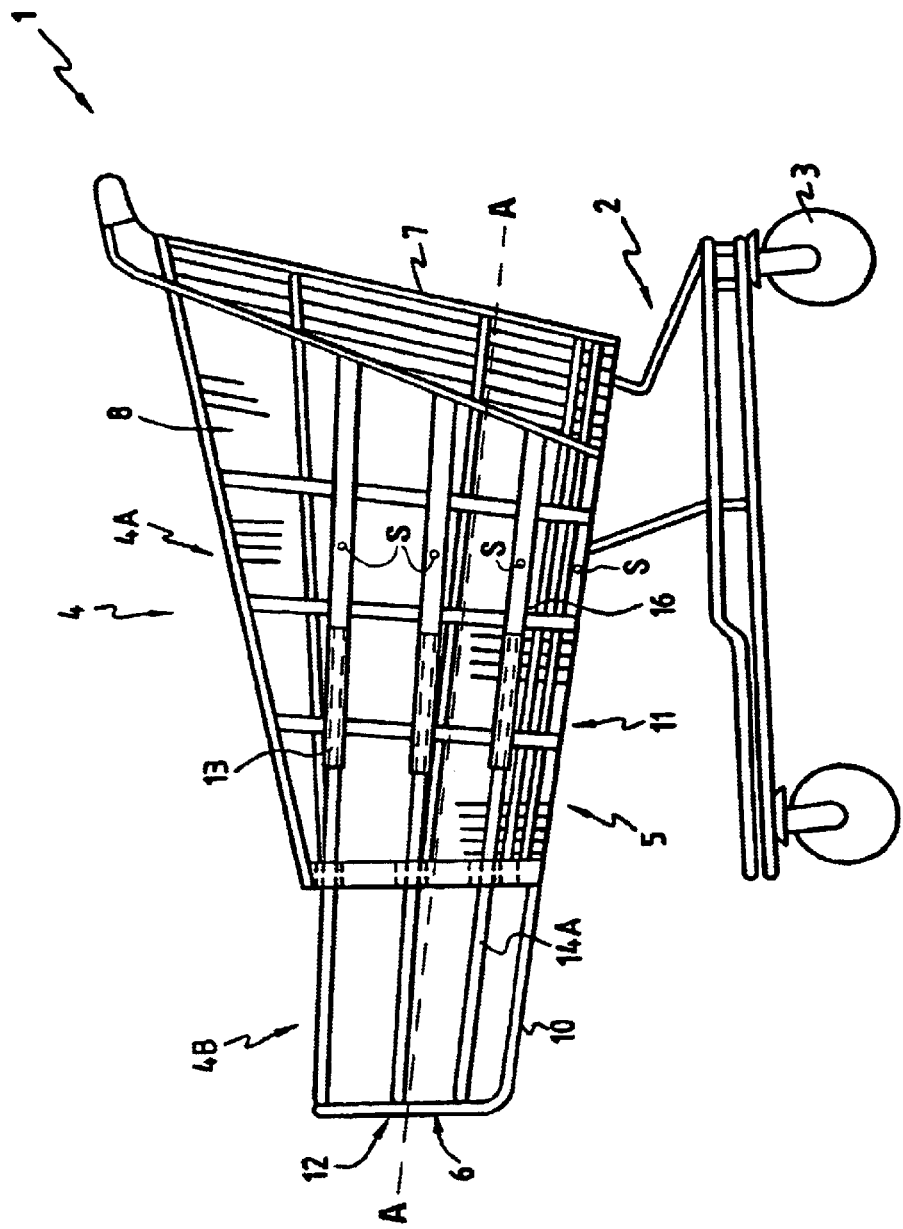
FIG. 1 is a side view of a cart according to the invention.

Conventionally, such a cart 1 comprises a chassis 2 equipped with wheels 3, which supports a basket 4.

This basket is generally obtained from wires shaped so as to delimit the bottom 5 the front wall 6, the rear wall 7 and the two left and right side walls 8.

In order to allow the carts to nest inside one another, particularly in order to store them behind one another, the basket has a vertical cross-section that, from the front wall to the rear wall, increases in size.

The space available between two nested carts is very small, on the order of sixteen millimeters, which is very small.

The bottom 5 is also inclined horizontally, rising as it extends away from the rear.

From the front wall, the two side walls diverge and increase in height.

Thus, seen from the top, the basket has the shape of an isosceles trapezoid, the large base of which is formed by the rear wall.

The volume of the basket is adjustable, and to this end, the basket comprises two parts, a fixed rear part 4A and a movable front part 4B.

According to one characteristic of the invention, the front part comprises:

- a lower wall 10 formed essentially of first slender elements 10A extending along the longitudinal axis of the basket, which cooperate via means for translational first guide elements 11 along the longitudinal axis of the basket with the bottom 5 of the rear part,
- the lower wall 10 extends in the plane of the front wall 6 and forms a support 12 bearing second tubular guide elements for translational guidance 13 along a horizontal axis B parallel to the front wall,
- second slender elements 14A forming two lateral sides 14, each parallel to a side wall 8 of the rear part 4A, which have their so-called proximal ends guided in translation with the side wall 8 in question and their other, so-called distal ends bent in the plane of the front wall so as to cooperate with the translational guide elements 13 borne by the support 12, thereby forming the front wall.

Figure 2:
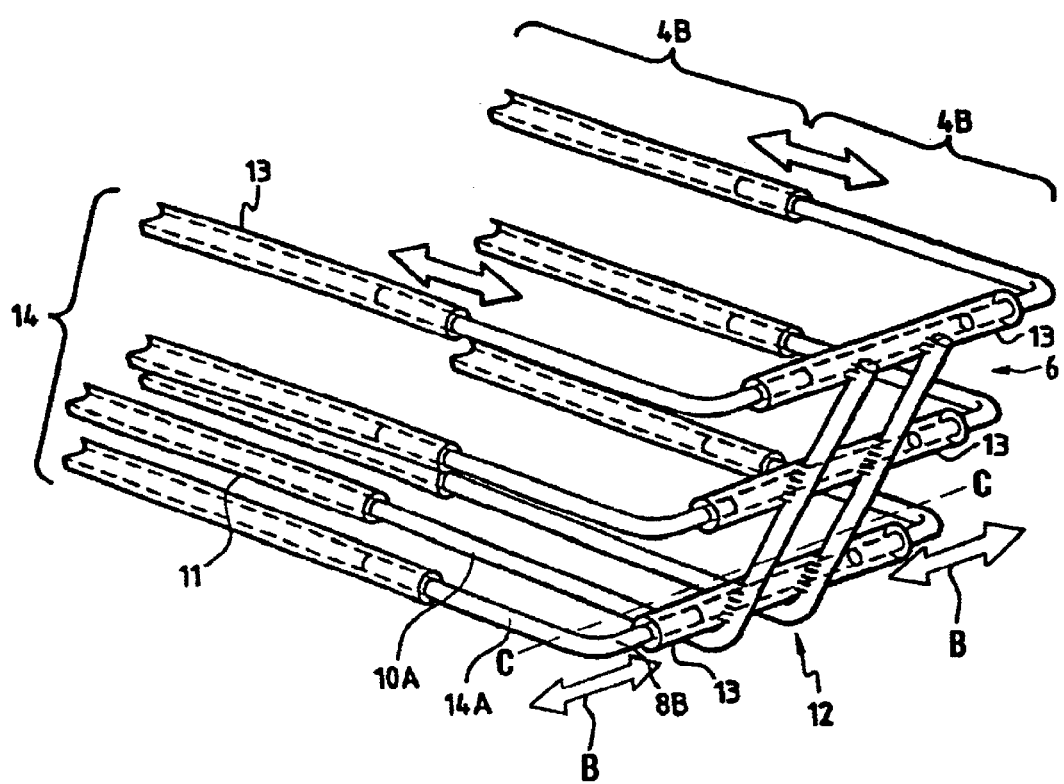
FIG. 2 is a view in perspective of the front end of a cart.

As shown in FIG. 2, the support 12 is formed, for example, from elements 10A that are bent upward and affixed to horizontal guide means 13.

The guide elements 13 borne by the support are, for example, constituted by tubes 13 open at both ends, into which the bent parts of 14A of the lateral sides are inserted.

These guide elements 13 also constitute crosspieces for maintaining the required separation of the slender elements 10A and give the basket, particularly its front part, sufficient rigidity to accommodate a load.

This technical arrangement allows the lateral sides 14 of the front part to remain constantly parallel to the lateral walls 8 of the back part during the movement of the front part in the direction of Arrow B, due to the automatic adjustment of the width of the front face when these lateral sides slide parallel to the side walls in the direction of the arrow B shown in FIG. 2.

FIG. 2 represents the movements of the various elements.

It includes means for adjusting the width of the front wall.

In essence, as the front wall moves away from the rear wall, due to the fact that the side walls are not parallel, the width of this front wall must be adjusted during the movement.

If this were not the case, the side walls would not remain flat, but would bend, and would not be able to return to the initial position.

The axes of the means for guiding the lateral sides and of the means for guiding the lower wall are parallel to one another, and are preferably parallel to the bottom.

The guide means 11, 13 for translationally guiding 11, 13 the side walls and/or the lower wall are also preferably, though not exclusively, tubes.

These tubes constitute, for example, a portion of the structure of the basket or are attached to either the inner or the outer face of the rear part.

In the case of the bottom, the tubes are housed inside the existing frame so as not to take up unnecessary space.

The tube has a circular, oval or polygonal cross-section.

Inside the tubes, it is possible to provide one or more races for improving the sliding motion.

Instead of tubes, it is possible to use slides, but of smaller thickness.

Quite clearly, there are stops "s" strategically located that limit the relative movement of the three parts constituting the front of the cart.

In one embodiment (FIG. 1), the front part is attached to an existing cart by retrofitting and therefore means are provided for joining to the structure of the cart.

To this end, the means for translationally guiding the lower wall and the lateral sides are attached by suitable fastening means 16 to the corresponding faces of the cart.

For example, the guide tubes may be supported by support plates attached by welding or clamping onto the wires constituting the existing cart, or these tubes are directly attached to the sides by welding.

It is important for the cart equipped with this basket to be able to nest inside another cart, and the aforementioned arrangements make that possible.

Advantageously, the support 12 that extends the lower wall has on its top edge a rounded surface that extends at least partially along this edge in order to push away the rear wall of another cart during nesting.

It is possible to provide, on the support, a front plate P for receiving an advertising placard.

The size of this plate would be at most equal to the size of the front surface when the front part is farthest away from the rear part.

Figure 3:
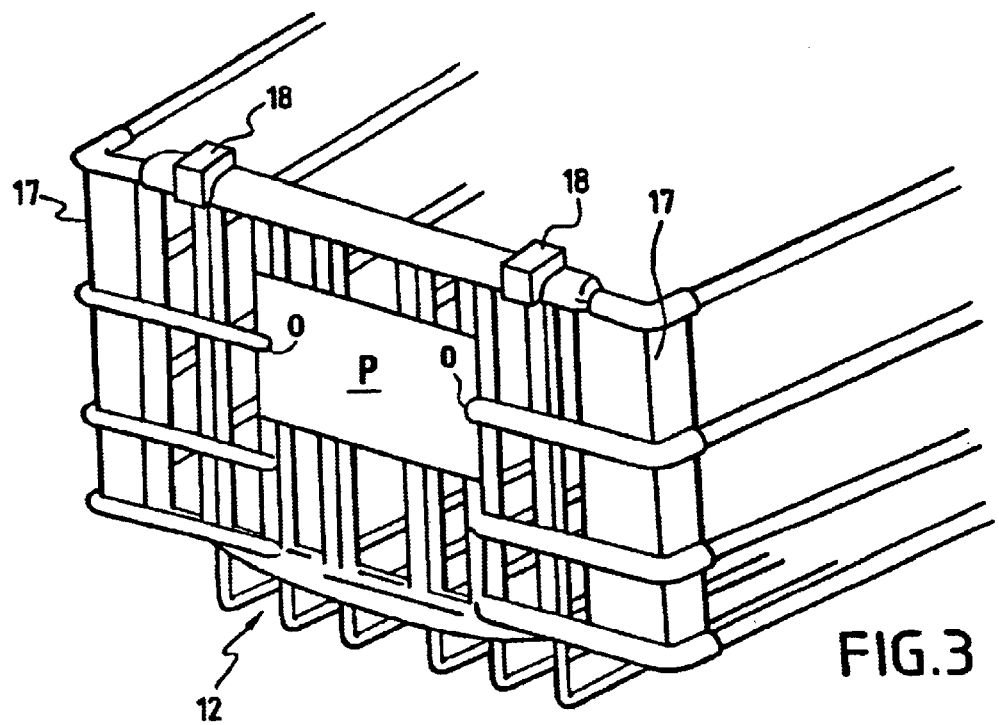
FIG. 3 is a view in perspective of a variant of the end of a cart.

In a variant of embodiment (FIG. 3), the support 12 is a plate made of synthetic material having openings "o" to which the ends of the elements 10A, which can be curved, are attached, for example by snapping.

This support 12 has corner pieces 17 in the form of angles that prevent the side walls, and hence the distal ends that cooperate with the guide means 13, from coming apart accidentally.

To prevent children from getting their fingers caught, the support 12 has stops 18 facing the rear of the cart so as to create a space between the support 12 and the front wall 6 when the front basket is attached to an existing cart.

These stops 18 are not necessary when the support 12 directly constitutes the front wall.

On existing carts, the movable front part is attached to the existing cart by means of a machine 100.

The latter comprises two lateral arms 110, acting like a clamp and pressing the guide tubes to the outer lateral faces of the existing cart.

A third arm 120 presses the guide tubes to the inside of the cart and to the bottom.

A welding robot then attaches the tubes by welding.

The tubes are positioned and held in place on the lateral arms by appropriate means such as magnets or clamps, for the time required for welding said tubes.

Figure 4:
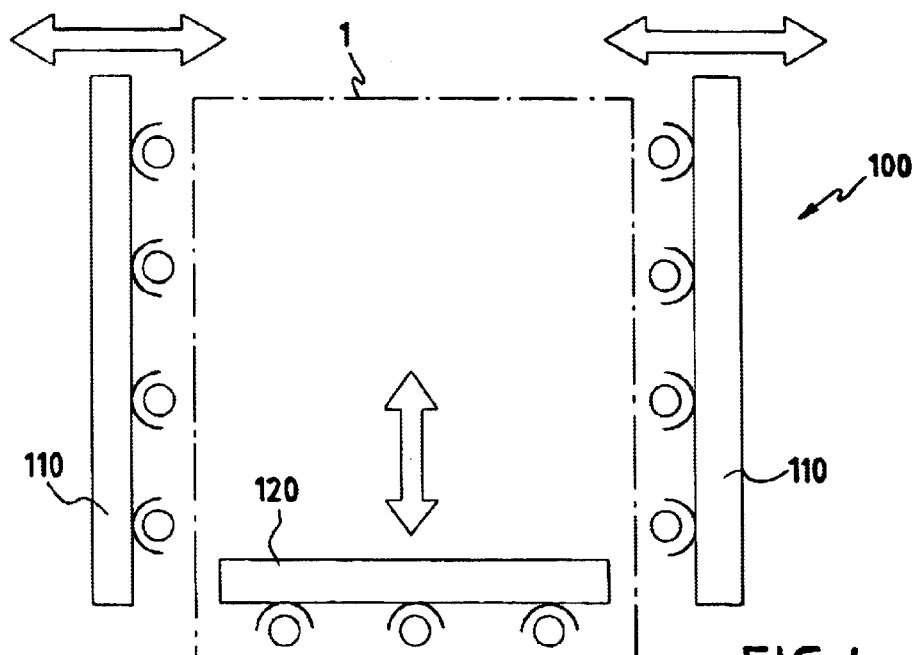
FIG. 4 is a schematic representation of the welding machine.

FIG. 4 schematically represents the welding machine.

The cart is represented in dot-and-dash lines.

While this invention has been described in conjunction with specific embodiments thereof it is evident that many alternatives, modifications and variations will be apparent to those skilled in the art. Accordingly, the preferred embodiments of the invention as set forth herein, are intended to be illustrative, not limiting. Various changes may be made without departing from the true spirit and full scope of the invention as set forth herein and defined in the claims.

What is claimed is:

1. A basket for a self-service store shopping cart comprising a bottom, a front wall, a rear wall and two left and right side walls, with a vertical cross section that, from the front wall to the rear wall, increases along a longitudinal axis A and a horizontal axis C, said basket comprising two parts, a fixed rear part and a movable front part, said movable front part including the front wall, the movable front part being movable between a nested position and an extended position, and a lower wall formed essentially of first slender elements extending along the longitudinal axis A of the basket, which cooperate with first guide elements for translational guidance along the longitudinal axis A of the basket with a bottom of the fixed rear part, said lower wall extending, to the front wall, a support having second guide elements for translational guidance along a horizontal axis C parallel to the front wall, second slender elements forming two spaced lateral sides, each parallel to a corresponding side wall of the fixed rear part, said second slender elements having proximal ends guided in translation with a corresponding side wall and distal ends bent parallel to the plane of the front wall so as to cooperate with the second guide elements borne by the support, thereby forming the front wall.

2. A basket according to claim 1, characterized in that the second guide elements borne by the support are constituted by tubes open at both ends, into which bent distal ends of the second slender elements forming the lateral sides are received.

3. A basket according to claim 1, characterized in that the second guide elements also constitute crosspieces for maintaining required separation between the first slender elements to provide rigidity to the front part of the basket.

4. A basket according to claim 1, characterized in that the longitudinal axes of the first slender elements and the longitudinal axes of the second slender elements are parallel to one another, and to the bottom of the basket.

5. A basket according to claim 1, characterized in that the first guide elements and the second guide elements are tubes for guiding the right side wall, the left side wall, and the lower wall.

6. A basket according to claim 5, characterized in that the tubes constitute a portion of the structure of the basket.

7. A basket according to claim 5, characterized in that the movable front part has an inner face and an outer face and the tubes are attached either to the inner face or to the outer face of the moveable front part.

8. A basket according to claim 1, characterized in that the movable front part is attached to an existing shopping cart and joins to the structure of said existing shopping cart.

9. A basket according to claim 1, wherein the support has a pair of corner pieces joining the front wall to each side wall.

10. A basket according to claim 1, characterized in that the movable front part has on its top edge a rounded surface that extends at least partially along this edge in order to contact the rear wall of another cart and facilitate the upward pivoting of said rear wall of said other cart during nesting.

* * * * *